July 25, 1967  SUSUMU OZASA ET AL  3,333,098
APERTURE DEVICE FOR ELECTRON MICROSCOPES AND THE LIKE
Filed July 29, 1964
FIG. 1(A)
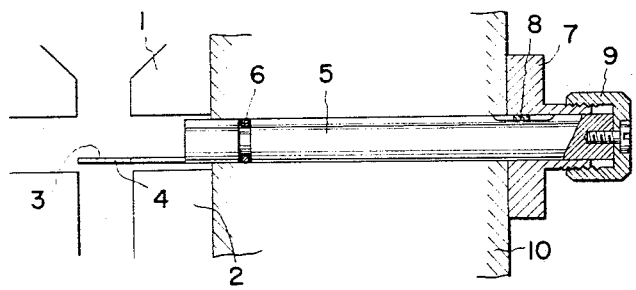
FIG. 1(B)
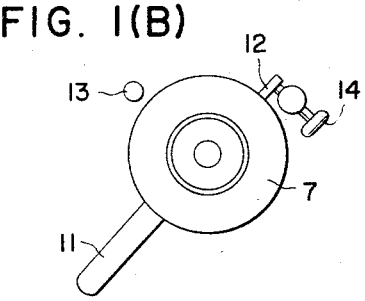
FIG. 2(A)
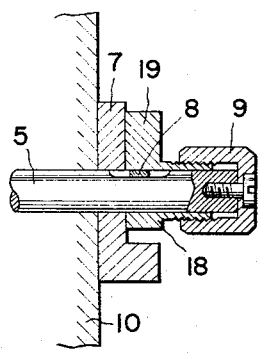
FIG. 2(B)
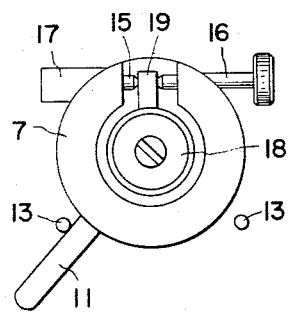
FIG. 3(A)  FIG. 3(B)  FIG. 3(C)
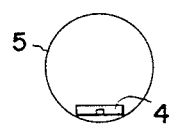 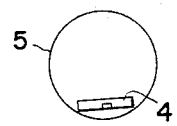 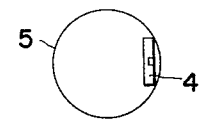
*INVENTOR.*
Susumu Ozasa
Hirokazu Kimura
Chikara Kimura
BY
Western & Western United States Patent Office 3,333,098
Patented July 25, 1967

3,333,098
APERTURE DEVICE FOR ELECTRON MICROSCOPES AND THE LIKE
Susumu Ozasa, Hachioji-shi, Hirokazu Kimura, Koganei-shi, and Chikara Kimura, Katsuta-shi, Japan, assignors to Kabushiki Kaisha Hitachi Seisakusho, Chiyoda-ku, Tokyo-to, Japan, a joint-stock company of Japan
Filed July 29, 1964, Ser. No. 385,995
Claims priority, application Japan, July 31, 1963, 38/37,974
1 Claim. (Cl. 250—49.5)

This invention relates to electron microscopes and the like and more particularly to a new diaphragm or aperture device with highly desirable features for electron microscopes and the like.

As is well known, electron microscopes have been provided at certain points therein with various aperture devices for the purposes such as reducing aberration and improving contrast. Ordinarily, these aperture devices are so constructed that they can be inserted in the position of the optical axis of the microscope or removed therefrom in accordance with their use. Particularly, an aperture (objective aperture) provided at the position of the objective lens is moved quite frequently, and, moreover, substantial accuracy is required in its movements.

For such an objective aperture, there are ordinarily provided several apertures of different aperture diameters so as to afford adaptability to various different uses, or several apertures of the same aperture diameter so as to facilitate replacement in the case of contamination of an aperture device. In one example of known practice, a plurality of these apertures are provided on a narrow plate which is fixed to the extreme end of a bar actuated from outside of the microscope structure. The bar is finely moved in its longitudinal direction to cause the axis of a selected aperture to coincide with the optical axis of the microscope and is moved longitudinally for changing apertures and for insertion and removal of the aperture. Fine movement of an aperture in transverse direction to the electron beam path is accomplished by swinging movement of the bar in the horizontal plane about a pivotal point on the bar.

When the electron diffraction image of a specimen is to be observed in an electron microscope, it is necessary to remove the objective aperture from the optical axis, as is well known. Furthermore, in the case when the electron microscope image (enlarged image) and the diffraction image are to be alternately observed, as in the case of observation of a crystalline specimen, it is necessary for each alternation of observation to repeat the insertion and removal of the objective aperture. In a conventional aperture device as described above, insertion and removal of the aperture are accomplished by a single actuation means. However, the operation of this means must include a step of relatively large displacement for bringing the aperture into or out of the optical axis and another step of fine adjustment for aligning the aperture axis with the optical axis. Consequently, when the actuation means is adapted to afford high precision (a positional precision of the order of a number of microns being required) of fine adjustment, its actuation stroke or travel for bringing the aperture into or out of the optical axis becomes large and requires much operational time. Conversely, when this operation is simplified, the precision of fine adjustment is lowered. Thus, it is difficult to satisfy both of the two conflicting requirements at the same time.

Furthermore, the aperture (field limiting aperture) disposed in the vicinity of the image plane of the objective lens (object plane of the intermediate lens) is inserted into position in the path of the electron beam for observation of an electron microscope image of a small area and a diffraction image of the same area and is removed therefrom for observation of an electron microscope image of a whole area. These actuation procedures are also accompanied by the above described difficulty.

It is a general object of the present invention to overcome the above described difficulty accompanying conventional aperture devices.

More specifically, it is an object to provide a new aperture device for electron microscopes and the like which has a relatively simple construction and an easy and highly efficient operation.

With the foregoing objects and other objects in view, the present invention, briefly described, resides in an aperture device of an arrangement and construction of parts wherein the aperture is eccentrically disposed relative to the axis of a rotatable shaft to which it is fixed, a turning lever for turning the rotatable shaft and a stop screw capable of adjustment with respect to the turning lever are provided. According to the invention, the aperture can be inserted into and removed from the electron beam path by operating the turning lever and can further be finely adjusted by operating the stop screw, whereby the aforementioned difficulty of known devices is completely eliminated.

The nature, principle, and details of the invention will be more clearly apparent by reference to the following description with respect to preferred embodiments of the invention, when read in conjunction with the accompanying drawing in which like parts are designated by like reference characters, and in which:

FIGURES 1(a) and 1(b) are respectively a side elevational, sectional view and a projectionally corresponding end view showing in simplified form the essential parts of one embodiment of the aperture device of the invention;

FIGURES 2(a) and 2(b) are respectively similar views showing another embodiment of the invention; and FIGURE 3 consists of three diagrams a, b, and c indicating the operation of the above mentioned embodiments of the invention.

The aperture device embodying the invention as shown in FIGURE 1 is installed through and on the outer wall 10 of an electron microscope at a point between magnetic poles 1 and 2 of an electron lens. Essentially, the aperture device shown comprises an aperture plate 4 provided with an aperture 3, a rotatable shaft 5 to the inner end of which the plate 4 is secured in an eccentric position offset from the axis of the shaft 5, a vacuum seal 6 provided between the shaft 5 and the microscope outer wall 10, a rotatable base 7 provided with a turning lever 11 and a stop 12 both formed integrally with the base 7, a key 8 for preventing rotation, a knob 9 for rotation, a stop pin 13 provided fixedly on the wall 10, and a stop screw 14 also supported on the wall 10.

By this arrangement and construction, fine movements to change the position of aperture 3 by axial movement of shaft 5 are accomplished by turning the knob 9. The insertion and removal of the aperture 3 are accomplished by mutually locking the rotatable base 7 and the shaft 5 by means of the key 8 so that they can rotate as a single body and then turning the lever 11. Fine movement of the aperture in the direction transverse to the electron beam path is obtainable by turning the stop screw 14.

In another embodiment of the invention as shown in FIGURE 2, the method of producing fine movements of the aperture in the direction transverse to the electron beam path differs from that of the example shown in FIGURE 1. That is, the insertion and removal of the aperture are accomplished by locking an intermediate member 18 formed integrally with the rotatable base 7 and the shaft 5 by means of the key 8 so that they can rotate as a single body and then turning the lever, similarly as in the first example. However, fine movements of the aperture in the direction of the electron beam path are produced by moving a projection 19 of the intermediate member 18 interposed between an adjustable screw 16 and a push rod 15 constantly pressed by a suitable spring 17, thereby to cause the shaft 5 to rotate.

FIGURE 3 indicates the states of the aperture as adjusted by the above described aperture devices. FIGURE 3(a) shows the case when the aperture 3 is set at its normal position, FIGURE 3(b) shows that when the aperture has undergone a fine movement in the direction of the electron beam path, and FIGURE 3(c) shows that when the aperture has been removed from the electron beam path.

As described above, by the present invention the action of insertion and removal of an aperture is changed from movement in the axial direction to a rotational movement, whereby the efficiency of this action is remarkably improved. Furthermore, since the fine movement actuation and the insertion and removal actuation can be readily separated, remote actuation of the insertion and removal is possible. For example, control of the aperture from a remote position may be accomplished by means to actuate the turning lever by the use of a flexible member such as a suitable cord or a chain or by the use of a force transmitting device such as a linkage. In the case of such means wherein return actuating force cannot be reversely transmitted, a means utilizing spring force or gravitational force to impart return force to the base 7 is, of course, used.

For the power source for the above described remote control, it is possible to use a motor, an electromagnetic device, or a fluid motor such as that utilizing air pressure or hydraulic pressure. The device of the present invention is advantageous in that, provided that the fit between the shaft and its bearings is precise, no displacement in the longitudinal direction occurs.

It sometimes is desirable that the objective aperture is removed from the electron beam path and the field limitation aperture substituted therefor. If both apertures have the same structure according to the invention and are operatively connected to each other with adequate remote control means as described above, it is possible to remove the objective aperture from the electron beam path and simultaneously to insert the field limitation aperture into the electron beam path by a single control action. Accordingly, the operational efficiency is considerably improved.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claim.

We claim:

An aperture device for electron microscopes and the like, comprising: a rotatable shaft installed through and on the outer wall of an electron microscope; an aperture plate having apertures secured eccentrically in a position offset to the extreme end of said rotatable shaft; a knob to produce fine movement of said rotatable shaft in the axial direction of itself and to exchange the aperture to be used; an adjustable screw and a stopper pin installed on said outer wall; a rotatable base having a turning lever and a stopper, said rotatable base being locked with said rotatable shaft by a key, being constructed to remove the aperture from an electron beam path by rotating said lever up to a point where said stopper is prevented from further movement by said stopper pin, and being inserted in the electron beam path by rotating said lever up to a point where said stopper is prevented from further movement by said adjustable screw, and said screw causing said aperture to move finely in the direction transverse to said electron beam path.

References Cited

UNITED STATES PATENTS

| 2,877,353 | 3/1959 | Newberry | 250—49.5 |
| 2,993,993 | 7/1961 | Delong et al. | 250—49.5 |

FOREIGN PATENTS

| L12356 | 6/1956 | Germany. |

RALPH G. NILSON, *Primary Examiner.*

A. L. BIRCH, *Assistant Examiner.*